United States Patent
Birklbauer et al.

(10) Patent No.: US 12,332,452 B2
(45) Date of Patent: *Jun. 17, 2025

(54) GEOMETRY MODELING OF EYEWEAR DEVICES WITH FLEXIBLE FRAMES

(71) Applicant: Snap Inc., Santa Monica, CA (US)

(72) Inventors: Clemens Birklbauer, Vienna (AT); Georg Halmetschlager-Funek, Vienna (AT); Jeroen Hol, Hengelo (NL); Matthias Kalkgruber, Vienna (AT); Daniel Wagner, Vienna (AT)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,166

(22) Filed: Jun. 13, 2024

(65) Prior Publication Data

US 2024/0329409 A1 Oct. 3, 2024

Related U.S. Application Data

(63) Continuation of application No. 18/137,729, filed on Apr. 21, 2023, now Pat. No. 12,032,168, which is a (Continued)

(51) Int. Cl.
*G02B 27/01* (2006.01)
*G06F 3/01* (2006.01)
(Continued)

(52) U.S. Cl.
CPC ..... *G02B 27/0172* (2013.01); *G02B 27/0176* (2013.01); *G06F 3/011* (2013.01);
(Continued)

(58) Field of Classification Search
CPC ............ G02B 27/0172; G02B 27/0176; G02B 2027/0138; G02B 2027/0154;
(Continued)

(56) References Cited

U.S. PATENT DOCUMENTS 10,638,124 B2 * 4/2020 Hicks .................. H04N 13/344
11,294,188 B1 4/2022 Birklbauer et al.
(Continued)

FOREIGN PATENT DOCUMENTS

| WO | 2019018396 A1 | 1/2019 |
| WO | 2019122496 A1 | 6/2019 |
| WO | 2020189864 A1 | 9/2020 |

OTHER PUBLICATIONS

International Search Report and Written Opinion for International Application No. PCT/US2021/052138, dated Dec. 21, 2021 (Dec. 21, 2021)—14 pages.

*Primary Examiner* — Nelson M Rosario
(74) *Attorney, Agent, or Firm* — CM Law; Stephen J. Weed

(57) ABSTRACT

An eyewear device with flexible frame for Augmented Reality (AR) is disclosed. At least two sensors and a display are mounted on the flexible frame. When in use, the real time geometry of the eyewear device may change from factory calibrated geometry, resulting in low quality AR rendering. A modeling module is provided to model the real time geometry of the eyewear device on the fly using sensor information of the at least two sensors. The modeled real time geometry is then provided to a rendering module to accurately display the AR to the user.

20 Claims, 10 Drawing Sheets

Related U.S. Application Data continuation of application No. 17/588,641, filed on Jan. 31, 2022, now Pat. No. 11,662,589, which is a continuation of application No. 17/089,454, filed on Nov. 4, 2020, now Pat. No. 11,294,188.

(60) Provisional application No. 63/085,913, filed on Sep. 30, 2020.

(51) Int. Cl.
  *G06T 19/00* (2011.01)
  *H04N 13/344* (2018.01)

(52) U.S. Cl.
  CPC ............ *G06F 3/017* (2013.01); *G06T 19/006* (2013.01); *H04N 13/344* (2018.05); *G02B 2027/0138* (2013.01); *G02B 2027/0154* (2013.01); *G02B 2027/0178* (2013.01)

(58) Field of Classification Search
  CPC .. G02B 2027/0178; G02B 27/04; G02B 7/12; G02B 2027/011; G02B 2027/0181; H04N 13/344; H04N 13/327; H04N 2213/001; H04N 2213/002; G06F 3/011; G06F 3/017; G06T 19/006
  See application file for complete search history.

(56) References Cited

U.S. PATENT DOCUMENTS

| | | |
|---|---|---|
| 12,032,168 B2 | 7/2024 | Birklbauer et al. |
| 2013/0278631 A1 | 10/2013 | Border et al. |
| 2014/0375681 A1 | 12/2014 | Robbins et al. |
| 2015/0138645 A1 | 5/2015 | Yoo et al. |
| 2016/0260251 A1 | 9/2016 | Stafford et al. |
| 2018/0096533 A1 | 4/2018 | Osman et al. |
| 2018/0295337 A1 | 10/2018 | Hicks et al. |
| 2019/0068944 A1 | 2/2019 | Zhang et al. |
| 2021/0048679 A1 | 2/2021 | Atac et al. |
| 2021/0337181 A1 | 10/2021 | Shin et al. |
| 2021/0405761 A1 | 12/2021 | Canberk |
| 2023/0106173 A1 | 4/2023 | Rabner |
| 2023/0341682 A1 | 10/2023 | Porter et al. |

* cited by examiner

GEOMETRY MODELING OF EYEWEAR DEVICES WITH FLEXIBLE FRAMES

CROSS-REFERENCE TO RELATED APPLICATIONS

This application is a Continuation of U.S. application Ser. No. 18/137,729 filed on Apr. 21, 2023, now U.S. Pat. No. 12,032,168, which is a Continuation of U.S. application Ser. No. 17/588,641 filed on Jan. 31, 2022, now U.S. Pat. No. 11,662,589, which is a Continuation of U.S. application Ser. No. 17/089,454 filed on Nov. 4, 2020, now U.S. Pat. No. 11,294,188, and claims priority to U.S. Provisional Application No. 63/085,913 filed on Sep. 30, 2020, all of which are incorporated fully herein by reference.

TECHNICAL FIELD

This disclosure relates to augmented reality for computer vision. More specifically, this disclosure relates to geometry modeling of an eyewear device with flexible frames in augmented reality.

BACKGROUND OF THE INVENTION

In recent years, computer vision ("CV") technology has been rapidly developing as a result of strong market demand of CV based applications. An important application of the CV technology is in the field of augmented reality ("AR"), which among other things provides interactive experiences for users in real-world settings with computer generated visual information. AR combines real-world data and computer-generated information to create a merged environment in which seamless overlay of the real and virtual world may be achieved. Users may use separate devices, such as wearable devices, including helmet, headgear, eyewear and the like to experience the augmented environment provided by an AR system. Eyewear devices such as AR glasses may be used in applications such as game playing, healthcare, virtual shopping, virtual touring and more. The eyewear devices may be configured to provide high accuracy, lightweight, good comfort and sufficient computational capability. For AR glasses and other eyewear devices, various sensors may be incorporated and/or integrated therein to conveniently collect real world information such as the position and orientation of the various sensors. The collected information may be transmitted to other components and/or devices of the AR system such as mobile devices and servers over interfaces or via wired and/or wireless networks. Various methods and algorithms may be used to compute and estimate sensor position and orientation based on the collected data by the sensors. The accurate and real time knowledge of the spatial relations among those sensors with reference to one another is essential for rendering high-quality imagery representations to a user in an AR system.

BRIEF DESCRIPTION OF THE DRAWINGS

The above-mentioned advantages and other features of the disclosure will become more apparent to and the invention will be better understood by persons of ordinary skill of the art, with reference to the following description of the present disclosure taken in conjunction with the accompanying drawings, wherein.

DETAILED DESCRIPTION

Figure 1:
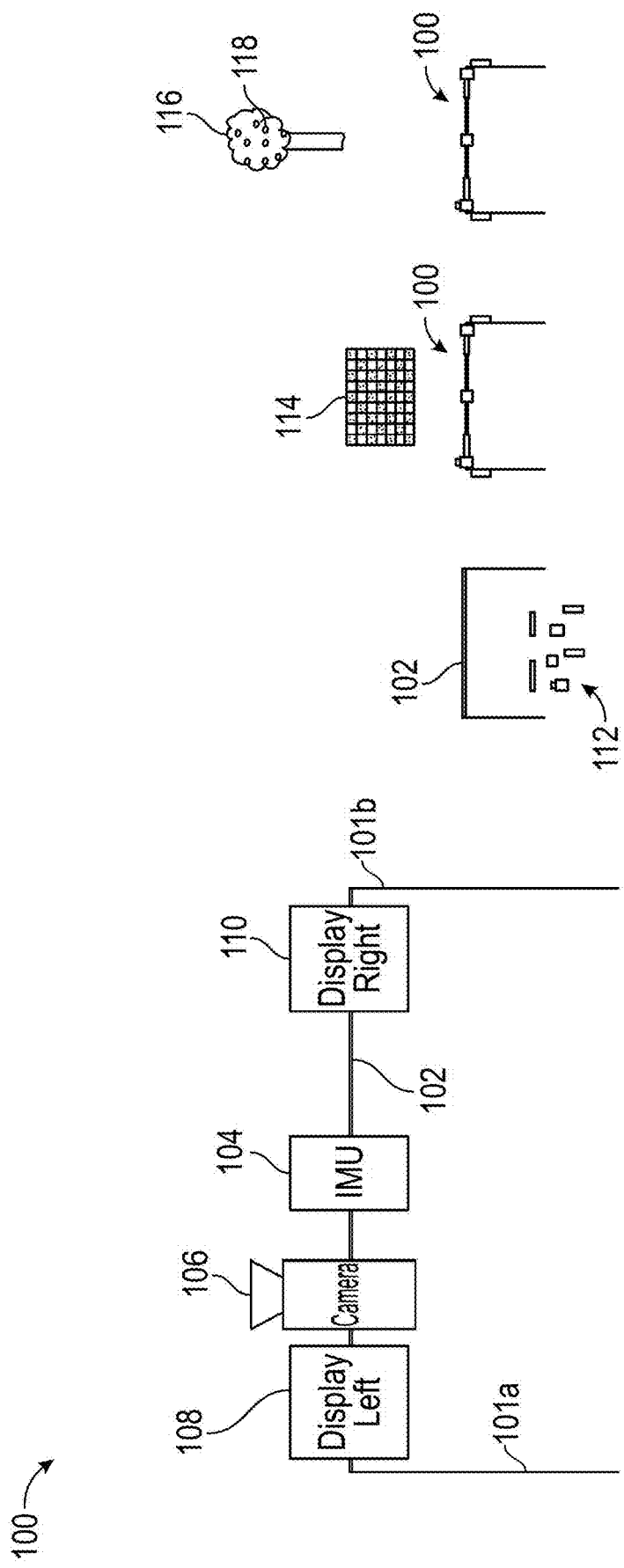
FIG. 1A illustrates an AR eyewear device.
FIGS. 1B, 1C, and 1D illustrate the factory calibration process of the AR eyewear device.

Several examples of the present disclosure are illustrated by the accompanying drawings and described in detail below. In the figures of the accompanying drawings, elements having the same reference numeral designations represent like elements throughout. The drawings are not to scale, unless otherwise noted. All terminologies and phraseologies used herein are for the purpose of illustrating only and should not be understood as limiting. The phrases such as "including", "comprising", "having" and other variations thereof are meant to encompass the items as described and their equivalents without excluding any additional items thereof.

Augmented Reality ("AR") system generally describes an interactive computer environment and user experience, wherein computer-generated sensory information may be rendered and/or combined with real-world environment comprising real-world objects. Real-world imagery may be captured by one or more image capture devices of the AR system and blended, overlaid and/or otherwise combined with computer-generated graphics, texts and/or other types of virtual objects. In other examples, the real-world environment may be presented to the user in a see-through manner, wherein the real-world imagery may go through the transparent optical waveguide of the eyewear device and be perceived directly by the eyes of the user. The augmented reality may be provided in real time or near real time to create a live user experience. The blended environment of the real and virtual worlds may provide realistic and seamless overlay of objects of the two worlds. The AR system may provide AR experience to a wide range of computer applications, such as gaming, teaching, healthcare, virtual touring, navigating and the like.

An AR system may provide enhanced experience for any sensory experience to the user to achieve a dual-world experience. However, accurately enhanced visual experience may typically be the key and challenging component or central focus of an AR system for various applications. To provide a sense of presence in such AR systems, an eyewear device for augmented visual experience may be provided. The eyewear device may be a physically separated or standalone device capable of communicating to components, programs, algorithms, modules as well as all other software, hardware and firmware components of the AR system via wired or wireless networks, buses, and/or any other interfaces. On the other hand, the eyewear device may also be a part of a helmet, headgear, or other head-mounted systems that may be worn by a user. The eyewear device may consist of any number of sensors, displays and other components. A suitable display system for the eyewear device may comprise single display for one eye, duplicated displays for both eyes, or stereoscopic displays, one for each eye, that creates three-dimensional scenes for the AR user. Any and all configurations of eyewear devices that are capable and configured of presenting a visually augmented environment to the user are within the contemplation of the present disclosure.

As described above, an AR system provides a real time or near real time AR experience to the user. The user may move about in a scene or near an area and the AR system allows the user to explore the scene and view the enhanced imagery in a timely fashion. In one example, the AR system may comprise one or more image capturing devices capturing video images of the scene or area at a sufficient refresh rate. The AR system may playback the real-world image to the user's eyes using images captured by the image capturing devices. The image capture device may be a camera with suitable optics and interfaces, input/output hardware, communication means, and image processing programs. In another example, the AR system may comprise see-through and/or transparent displays that allow the real-world images to be perceived directly by the user's eyes and overlays the see-through image with augmented imagery.

The AR system may also need to determine the position and the point of the view of the image capturing device in reference to the user's surroundings. A tracking system may be incorporated in the AR system for recognizing the movement of the user by observing trackable features and track them accordingly. The tracking system incorporated in the AR system may need to accurately track the pose, i.e., position and orientation, of the optical sensors of the system such as the image capturing camera and/or other image capturing devices. The tracking is necessary to allow the AR system to render the virtual imagery in an accurate fashion. When the tracking is inaccurate, the seamless overlay of the real and virtual worlds may be lost. However, on many occasions, the image capturing device such as a camera may not be sufficient and/or efficient to provide for an accurate rendering of the AR experience alone. For example, there might be noises captured or generated in processing the captured images; or sometimes the image capturing device may fail due to fast movement, blur or other real-world conditions the AR system encounters. As such, additional measurements for supplementing visual data may be helpful and obtained from other sensors, such as the inertial sensors.

Inertial sensors may comprise any numbers of devices that measure local motion. Typically, inertial sensor may comprise one or more accelerometers and/or gyroscopes to detect the acceleration and rotation changes the inertial sensor is experiencing. A tracking system may take advantage of the data and information provided by the inertial sensors and may enhance and supplement the visual tracking methods based on images captured by cameras. For example, Visual Inertial Odometry ("VIO") technology has been developed to utilize the data provided by inertial sensors incorporated in the AR system to provide for accurate and robust tracking. Such VIO system may more accurately detect and apply to the rendering of the augmented environment the user's change in position, velocity and orientation, based on data provided by the readings of the inertial sensors.

Inertial sensors may encapsulate, incorporate and/or integrate the various accelerometers, gyroscopes and other sensors in one physical unit, such as in IMUs (Inertial Measurement Unit). There are many types of IMUs adapted to many different applications, such as Micro Electro Mechanical Sensors (MEMS) IMU, Fiber Optic Gyro (FOG) IMU, Ring Laser Gyro (RLG) and more. Miniature IMUs may typically be adopted in AR systems allowing for user mobility. Such IMUs may be standalone or included and/or integrated with other components and devices of the AR system. For example, in an AR system comprising eyewear devices, the IMUs may be placed on the frame of the eyewear devices alone, incorporated into the eyewear device with other sensors in conjunction, or pre-integrated with other sensors in one unit and incorporated into the eyewear system as one unit.

Depending on the type of the IMU which may be found in common mobile devices, the IMUs integrated into an AR system may be configured to measure very small changes in velocity as well as sampling/refreshing at a high frequency for the purpose of an AR system. For example, the IMU may have a sampling rate of eight hundred Hertz (800 Hz) or higher, which is much higher than the video refresh rate, such as thirty Hertz (30 Hz) or sixty Hertz (60 Hz). As such, the IMU may provide ample data rate for the purpose of the tracking system.

In an AR system comprising an eyewear device, the eyewear device may include a variety of components and other devices, such as one or more cameras, displays, IMUs and other components or devices. Any two or more of those components may also be incorporated in one or more units located at suitable positions of the eyewear device. The components and devices of the eyewear device may communicate with each other over wired and/or wireless interfaces.

FIG. 1A illustrates an eyewear device of an AR system according to an example of the present disclosure. Referring to FIG. 1A, the eyewear device 100 may be an AR eyeglass or any other types of wearable device that can be affixed to a user or a part of a headgear of the AR system. The eyewear device 100 may comprise a frame 102. The frame 102 may comprise a front façade with scene-facing and/or user-facing sensors and other devices. The frame 102 may also comprise stabilization means to stabilize the eyewear device on a suitable part of the user, such as on the user's head. Such stabilization means may be a pair of frame arms 101a and 101b as illustrated in FIG. 1A. The eyewear device 100 may also include displays 108 and 110 comprising transparent optical devices such as waveguides that allow the real-world image to go through and simultaneously have virtual images projected on them such as with projectors (not shown) to present the overlaid real-world and virtual world to the user. In such an example, the user may wear the eyewear device 100 like regular eyeglasses. For simplicity, the front façade and the arms 101a and 101b of the eyewear device 100 are illustrated in straight lines in FIG. 1A. It is understood by persons of ordinary skill in the art that the design of the shape, size and contour of the eyewear device 100 may be different from the conceptual illustration of FIG. 1A. Any design and style of the frame of the eyewear device 100 that is suitable for an AR system is contemplated and within the scope of the present disclosure. The frame 102 may be made from materials such as plastics, metal and the combination of plastics and metal, such as acetate, propionate, nylon, titanium, stainless steel and Monel. The frame 102 is preferred to have suitable rigidity, durability and integrity for configuring various components and the devices of the eyewear devices 100 on the body of the frame 102.

According to an example of the present disclosure, any number of sensors, displays and other components of the AR system may be physically attached or affixed to the body of frame 102, including the front façade, the left and right arms 101*a* and 101*b* and any other suitable place of the eyewear device 100. The sensors, displays and other components may include inertial sensors such as IMU 104, image captures such as still camera and/or video camera 106, displays 108 and 110, projectors, proximity sensors and the like, all of which may be mounted on any place of the frame 102. According to an example, the image captures are scene-facing for capturing the moving scenes as the user moves about his or her surroundings. According to another example, the display devices may be located in front of the eyes of the user for easy observation. According to an exemplary layout of the sensors, components and devices of the eyewear device 100 illustrated in FIG. 1A, an inertial sensor 104 may be located in the middle of the front façade of frame 102. According to this example, to one side of the inertial sensor 104 on the front façade of the frame 102, a camera 106 may be mounted thereon. The camera 106 may be configured to face the scene in order to capture the environment the user is in. Near the corner where the front façade of the frame 102 and the frame arms meet, there may be one or more display devices located thereon, e.g., a left display 108 and a right display 110 as illustrated in FIG. 1A. Persons skilled in the art understand that the number, type and position of the sensors and all other components that are mounted on the frame 102 as shown in FIG. 1A are illustrative only and not limiting.

It is contemplated that sensors of different types may be integrated together and mounted on the frame 102 as one unit. For example, an integrated device comprising one or more camera and IMU sensors may be configured in one unit and mounted on the eyewear device. For another example, the eyewear device 100 may comprise more than one inertial sensor 104 and/or camera device 106.

As described above, one or both of the displays 108 and 110 may comprise optical waveguides to be used in connection with projectors. In such examples, the optical waveguide may be a transparent or see-through optical device that allows computer-generated virtual objects to be rendered on, such as by a projector placed behind the waveguide. The optical waveguide may then be placed in front of the eye of the user. In the AR application, real objects may be directly perceived by the user through the transparent or see-through waveguide, whereas virtual objects may be projected onto the waveguide in such a way that the user sees a merged augmented reality. In one example, the optical waveguide may be a see-through glass.

Persons skilled in the art also understand that FIG. 1A is an exemplary schematic illustration of the AR eyewear device 100 viewed from the top perspective. It is contemplated that the sensors, components and/or devices mounted thereon may be located at any portion of the eyewear device 100 and the frame 102 thereof, including the top, bottom and anywhere between the top and bottom of the eyewear device 100. According to an example of the present disclosure, it is preferred that at least one camera 106 and at least one IMU 104 are incorporated into the eyewear device 100 as separate units, which will be described in more details in the present disclosure.

The AR system and its components thereof may utilize the knowledge of the spatial information of and spatial relations among all of its sensor components. For example, the knowledge of the spatial relation between the camera and the IMU of the AR system may allow the system to compute the camera pose based on IMU readings. For another example, the information of the spatial relation between the camera and the display device may help with the accurate rendering of the virtual object on the display based on information extracted from captured images. In addition, the display's geometry information or any change thereof may also provide critical information to the tracking algorithms used by the AR system.

Therefore, in order for the eyewear device to work with an AR system, the sensors and components described herein need to be properly assembled and mounted on the eyewear device according to a particular design. They may then be carefully calibrated in factory or other calibration facilities and the calibrated parameters are recorded and provided to the AR system in which the eyewear device may be used. After the various components are mounted on the system, the calibration process adjusts the settings of all adjustable parameters and devices of the components and devices based on the pre-determined positions and spatial relations according to a particular design. After the calibration is completed, all components of the eyewear device shall work together to present a seamless augmented reality in the factory setting. Typically, after the calibration process, the eyewear device is in condition to be supplied and integrated with the AR system configured to incorporate the calibrated eyewear device.

FIGS. 1B-1D illustrate an exemplary assembling and calibration process of the eyewear device according to the present disclosure. Referring to FIG. 1B, before the sensors and other components of the eyewear device 100 are put together, the components and sensors 112, which may include the inertial sensor 104, camera 106, displays 108 and 110, and other components that may be selected for the eyewear device, may be scattered around and there may not be any fixed spatial relations among them. During the assembly process, the components will then be set onto the eyewear device 100. After the assembly, the components are set in predetermined positions on the eyewear device 100, forming fixed spatial relations among them. The assembled eyewear device 100 may then undergo a robust factory calibration process to ensure that all components and devices of the assembled eyewear device 100 are configured to perform the functions they are designed for in order to provide a desired augmented environment under the factory calibration settings.

FIG. 1C illustrates an exemplary calibration process. Referring to FIG. 1C, a checkered box 114 placed in front of the eyewear device 100 representing a symbolic calibration process. There may be any number of steps involved and performed known in the art in order to properly calibrate the eyewear device, all of which are within the scope of the present disclosure.

When the factory calibration is completed, the eyewear device 100 is ready to provide a realistic view rendering augmented reality under factory setting. FIG. 1D illustrates an example of such a rendering effect after calibration in factory setting. In the scene depicted in FIG. 1D, a tree 116, which is a real-world object, is displayed to the user. In an example, the tree 116 may be presented to the user in a see-through manner, in which the image of the tree goes through the transparent optical waveguide of the eyewear device and perceived directly by the eyes of the user. Also depicted in FIG. 1D are a number of small circles 118 therein representing virtual apples graphics generated by computer.

When the calibration is completed and successful, the virtual apples 118 are expected to be seen within the canopy of the real-world tree 116 as observed from the displays of the eyewear device by the user such that a perception of the tree 116 with virtual apples 118 hanging on it is created. As can be appreciated from this particular example, to provide a realistic and believable apple tree, all pixels of the circles 118 representing the apples shall be rendered within the boundary of the canopy of the tree 116 when a user views the scene from the position where the eyewear device is located. In traditional AR systems, the spatial relations among the components of the eyewear device need to be kept in the same condition in order to provide an accurate rendering in subsequent applications. The performance of traditional AR system is sensitive to how well the spatial relations are kept in subsequent use, and even small spatial distortions among them may cause problems. In the apple tree example, such distortions may cause one or more of the apple pixels to be displayed off the tree canopy which diminishes the user experience. In addition to the spatial relations among the components, geometry conditions of the eyewear device also need to be kept intact after factory calibration in the traditional AR systems. For example, for AR systems with displays that use see-through waveguide, any distortion of the geometry of the waveguide may also greatly affect the quality of the augmented scenes. Persons skilled in the art may understand that the spatial relations among the components of the eyewear device may also be included in the overall geometry of the eyewear device. As such, the term geometry throughout the present disclosure refer to both the spatial relations among the components and the geometry of each component, unless indicated otherwise.

Figure 2:
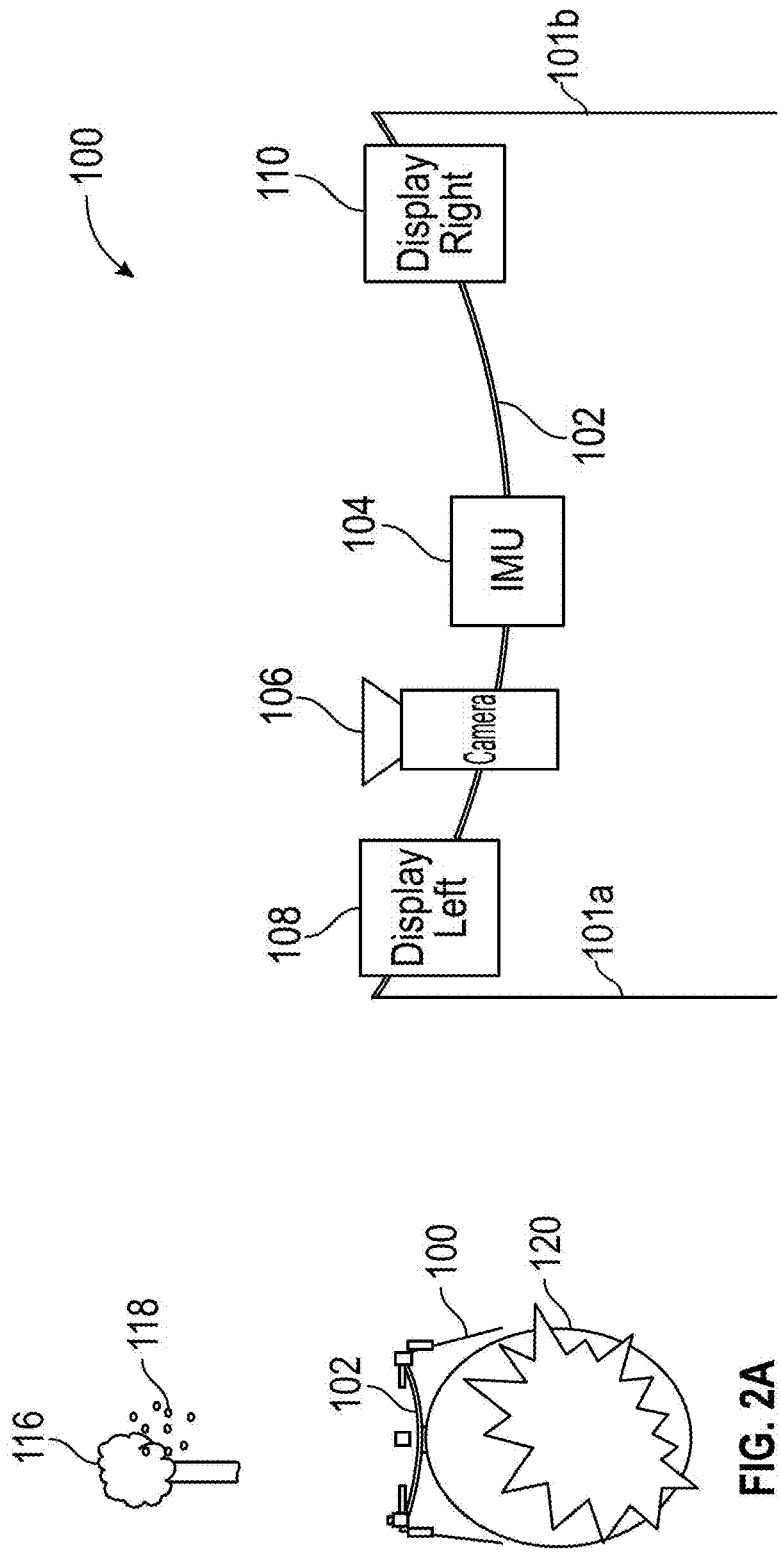
FIGS. 2A and 2B illustrate an example of bending an AR eyewear device and the effect thereof.

The geometry of the eyewear device calibrated in the factory may be changed in subsequent applications. That is, when in use, the eyewear device may be placed under conditions that are different from the factory settings which changes or distorts the geometry of the eyewear device. One of the situations in which the geometry of the eyewear device components may be distorted is when the frame of the eyewear device deforms as a result of the use either temporarily or permanently. For example, in order to be worn securely, users with different physicality features may cause the frame of the eyewear device to deform in different ways. FIG. 2A illustrates such an example. In FIG. 2A, a user 120 who wears an eyewear device 100 causes the sides of the eyewear device to thrust forward and changes the geometry of the eyewear device. Due to the shape, proportion, size and other aspects of the user's head and/or other physiological characteristics of the user, the frame 102 may be bent. The bending may become more pronounced if the frame 102 is made of material that is easy to bend.

The geometry distortions such as the bending of the frame in FIG. 2A may cause the calibrated eyewear device to deviate from its predetermined geometry under factory calibration and reduce the AR quality. FIG. 2B is a close view of the bent eyewear device 100. As illustrated in FIG. 2B, the bending of the frame changes the spatial relations among the components of the eyewear device such as the IMU 104, camera 106 and the displays 108 and 110, as well as the display geometry. For example, in factory calibration the components of the eyewear device 100 may be located in a linear arrangement on a frame with substantially flat façade as illustrated in FIG. 1A. But when the user put the eyewear device on, the frame may be bent. Consequently, the bending is likely to alter the geometry of the eyewear device. If such effects of bending are not addressed by the AR system, the rendering of the augmented reality may be off similar to what is illustrated in the example of FIG. 2A, wherein the pixels of the virtual apples 118 are rendered outside the canopy of the tree 116 and the user sees an unreal scene.

Figure 3:
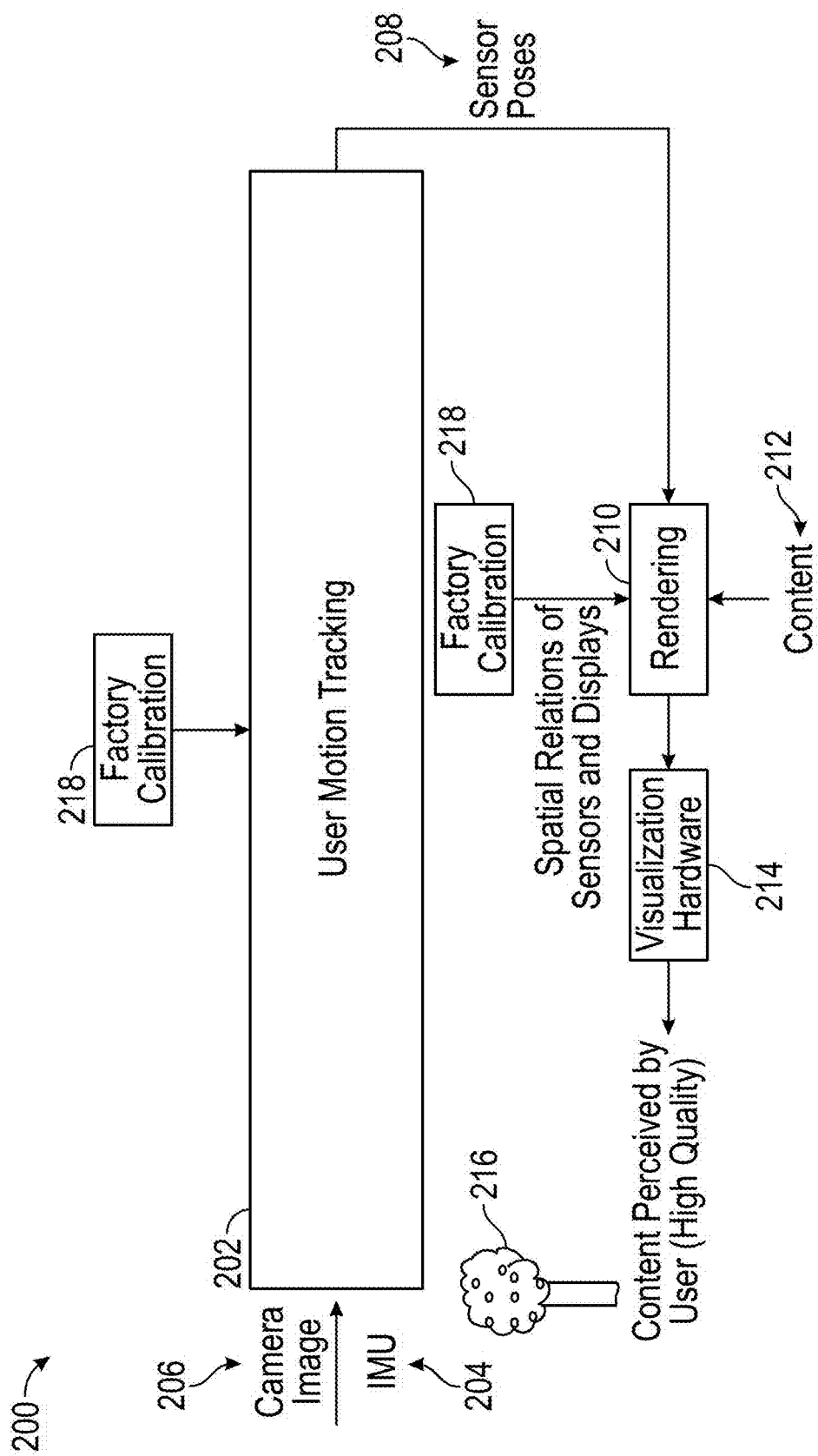
FIG. 3 illustrates a prior art AR system.

This sensitivity of an AR rendering quality to the bending of the eyewear device frame may be attributed to the tracking algorithm and other components and processes of the AR system that work in conjunction with the eyewear device for rendering the augmented scenes. FIG. 3 is a diagram of an exemplary AR system according to the conventional art. Referring to FIG. 3, the AR system 200 may comprise a number of hardware, software, firmware and combination thereof. More specifically, the AR system may comprise a user motion tracking module 202. The user motion tracking module 202 tracks the position and the orientation of the eyewear device and the sensors thereon, including the IMUs and cameras. The user motion tracking module may be configured to take the inputs of the image capture device, such as a camera captured image 206 and readings of the IMU inertial data 204. The image capture device may be camera 106 in FIG. 1A or any other image capture devices suitable for capturing images to be used by the AR system. The IMU inertial data may be provided by an IMU sensor such as the sensor 104 in FIG. 1A. The IMU data 204 and the image data 206 are captured in real time when the eyewear device is in use in an AR application. In addition, the user motion tracking module 202 may also take static and/or pre-determined data or parameter of the eyewear device and other devices in calculating the real time position and orientation of the eyewear device. For example, the predetermined factory calibration parameters 218 may be fed into the tracking module for the tracking purpose of the AR system.

As described elsewhere, with the image data from the image capturing device and the IMU readings from the IMU sensor, the tracking module may be configured to compute the poses of the IMU and camera using a number of algorithms for computer vision processing. In some examples of the computer vision processing algorithm, the geometry data of the eyewear device may be used for estimating the poses of some components when the pose of one or more other components are known. For example, if the pose of the camera is known, the spatial relation between the camera and the IMU, the display and/or other components of the eyewear device may be used to quickly compute those components' respective poses. That is, the geometry information of the eyewear device such as the spatial relations among the components of the eyewear device may be used to cost-effectively compute the poses of some components from one or more known pose of some other components of the eyewear device. Because computing the poses from sensor data is computationally expensive for some components and may be impossible for others, deriving the poses of some components using geometry data of the eyewear device is more advantageous.

Further referring to FIG. 3, according to an example of the conventional art, sensor poses 208, such as the IMU sensor, the optical sensor comprised in the camera and other sensors may be provided as an output by the user motion tracking module 202. Thereafter, the tracking module 202 may be configured to feed the sensor poses 208 to a rendering module 210. The rendering module 210 may take the content 212 to be rendered by the AR system as an input. The content 212 may include virtual graphics and/or other information as well as the real-world objects to be merged together. For example, the content 212 may comprise the virtual apples 118 generated by the AR system and the real-world tree 116 that are introduced in a see-through manner as described earlier.

The sensor poses 208 may provide indication of and guidance to the rendering module 210 for organizing and arranging the real and virtual objects in the same frame of a video sequence. Additionally, the rendering module 210 may also take the factory calibration data 218 as input. For example, the factory geometry data are fed into the rendering module 210, such that the rendered image to be displayed may be adjusted according to the geometry data. Thereafter, the rendering module 210 processes the various inputs and provide the rendered content as output to the visualization hardware 214. The visualization hardware 214 may be displays 108 and 110 as illustrated in FIG. 1A. Thereafter, a seamless augmented reality scene may be presented to the user's eyes. For example, in a see-through manner, the user may perceive a perfect apple tree 216 as a result of the combining a see-through real-world tree with the computer-generated virtual apples.

As can be appreciated by persons skilled in the art from the description of the conventional art in connection with FIG. 3, factory calibration parameters are used for rendering. When the frame of the eyewear device bends, however, it may distort the geometry of the eyewear device, which may cause deterioration of the AR system. The effect of the geometry distortion of the eyewear device will be described in further detail in conjunction of an exemplary user tracking module as illustrated in FIG. 4.

Figure 4:
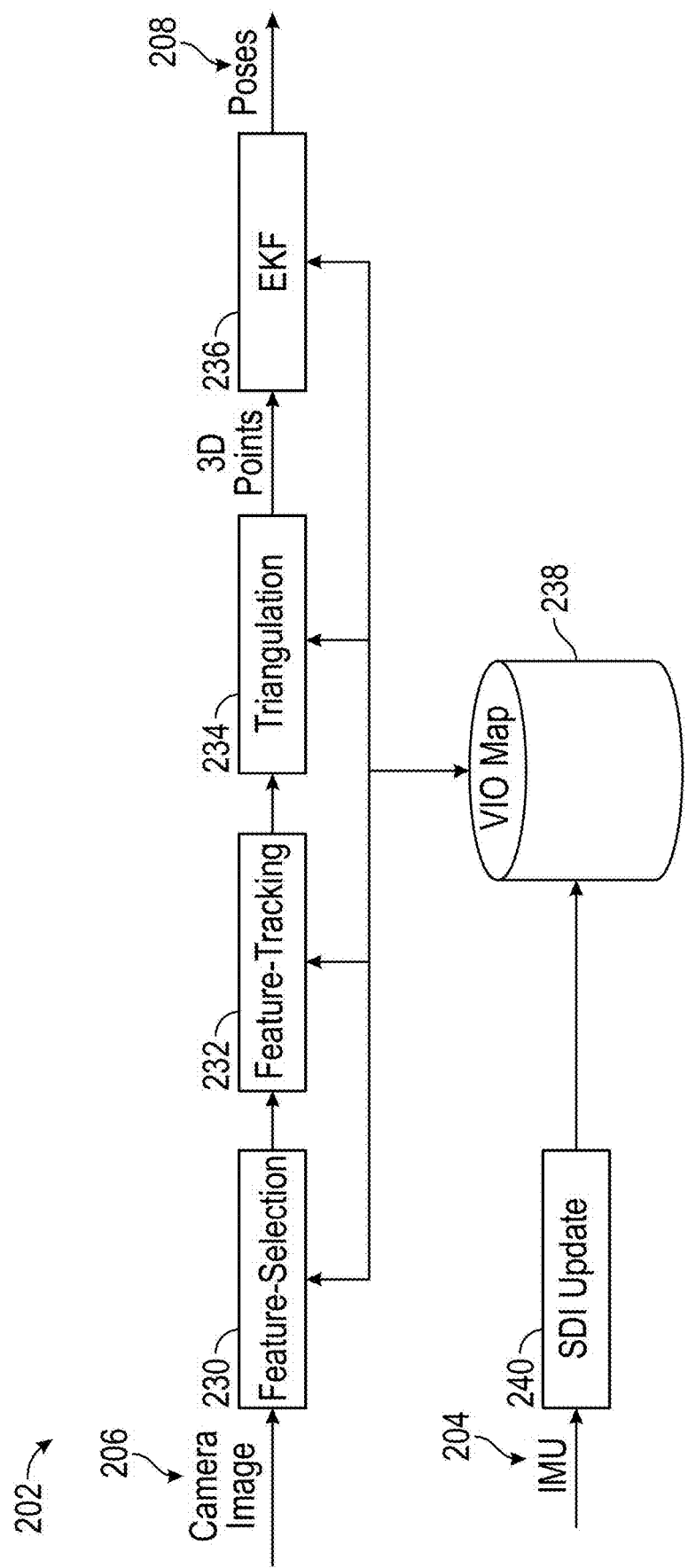
FIG. 4 illustrates the user motion tracking module of the prior art AR system.

In FIG. 4, an exemplary user motion tracking module using an Extended Kalman filter (EKF) is illustrated herein. Referring to FIG. 4 and in conjunction with FIG. 3, when IMU data 204 and camera image 206 are fed into the user motion tracking module 202's pipeline, in the EKF-based tracking system, they are separately fed into different and parallel components of the EKF tracking system. With regard to the IMU data 204, it may go over a Strapped Down Integration (SDI) update 240 and then be fed into the VIO system 238. In parallel, the camera image 206 may be fed to a number of modules.

First, the camera images 206 may be fed to a module of features selection 230. The goal of features selection 230 is to find new and/or well-trackable features that can be selected as targets for tracking from frame to frame of a video sequence. Typically, corners, edges and other easy-to-find features may be selected as tracked objects. After features are selected, the selected features are tracked from frame to frame in a video sequence in the module of feature tracking 232. In this step, the selected features are detected in subsequent new images as accurately as possible. The next module in the user tracking module 202 pipeline on the camera image side may be triangulation 234. In one example of the user tracking module 202, a six-dimensional (6D) tracking module may be adopted for tracking the object in a three-dimensional (3D) space. The tracking module may provide spatial readings of the tracked object in the full six dimensions, including one set of three-dimensional readings measuring the position and another set of three-dimensional readings measuring the orientation. With the 6D readings, the EKF module 236 may calculate the camera pose 208 in conjunction with the IMU data.

EKF is a well-known method for estimating camera poses and parameters using camera and IMU data. One of the assumptions of the EKF method is that the IMU and image captures are physically tightly coupled, which makes the EKF method especially suitable for VIO applications where the IMU and camera are integrated in a rigid-body object, such as the eyewear device with a rigid frame. If the spatial relations between the IMU and the cameras change on the fly, the computation and the resultant rendering will be inaccurate. As such, the exact knowledge of the geometry of the eyewear device is vital for rendering accurate AR scenes. Presently, maintaining fixed geometry of the eyewear device may be accomplished by choosing rigid material for the eyewear device, especially the frame of the eyewear device, which may prevent the geometry of the eyewear device such as the special relations among the displays, cameras, IMUs, and projectors from changing during operation.

However, although they may be desirable for retaining the eyewear geometry calibrated in the factory, rigid frames for eyewear devices may be bulky, uncomfortable and/or unfashionable. In addition, users may prefer wearing ergonomically comfortable and visually appealing eyewear according to their personal preferences and/or trends. Such eyewear devices may require more flexible and/or bendable materials for the frame. However, flexible and/or bendable materials make it easy for the eyewear device to lose its factory geometry the conventional AR system's algorithms rely on.

As such, it is desirable to have an AR system that does not rely on the factory geometry of the eyewear device to provide accurate AR rendering. However, it is observed that the change of the eyewear device geometry such as the display geometry and spatial relations among the components may not be pre-determined, such as when the factory calibration is performed. The present disclosure discloses an AR system that accommodates the geometry change of the eyewear device by estimating the current geometry of the eyewear device on the fly. As a result, the present disclosure provides accurate AR rendering even when the eyewear device loses its factory geometry in use.

It is further observed that the geometry change of the eyewear device may only need to be determined once per use, instead of being tracked and/or modeled in real time at a high frequency. That is, the geometry change caused by a user in a particular application is likely to remain constant during the use. The geometry change may persist until for example when the application is finished, or when the user takes off the eyewear device. Therefore, the modeling of the geometry change may be viewed as semi-dynamic, which indicates a comparatively lower computational cost in the AR system.

Figure 5:
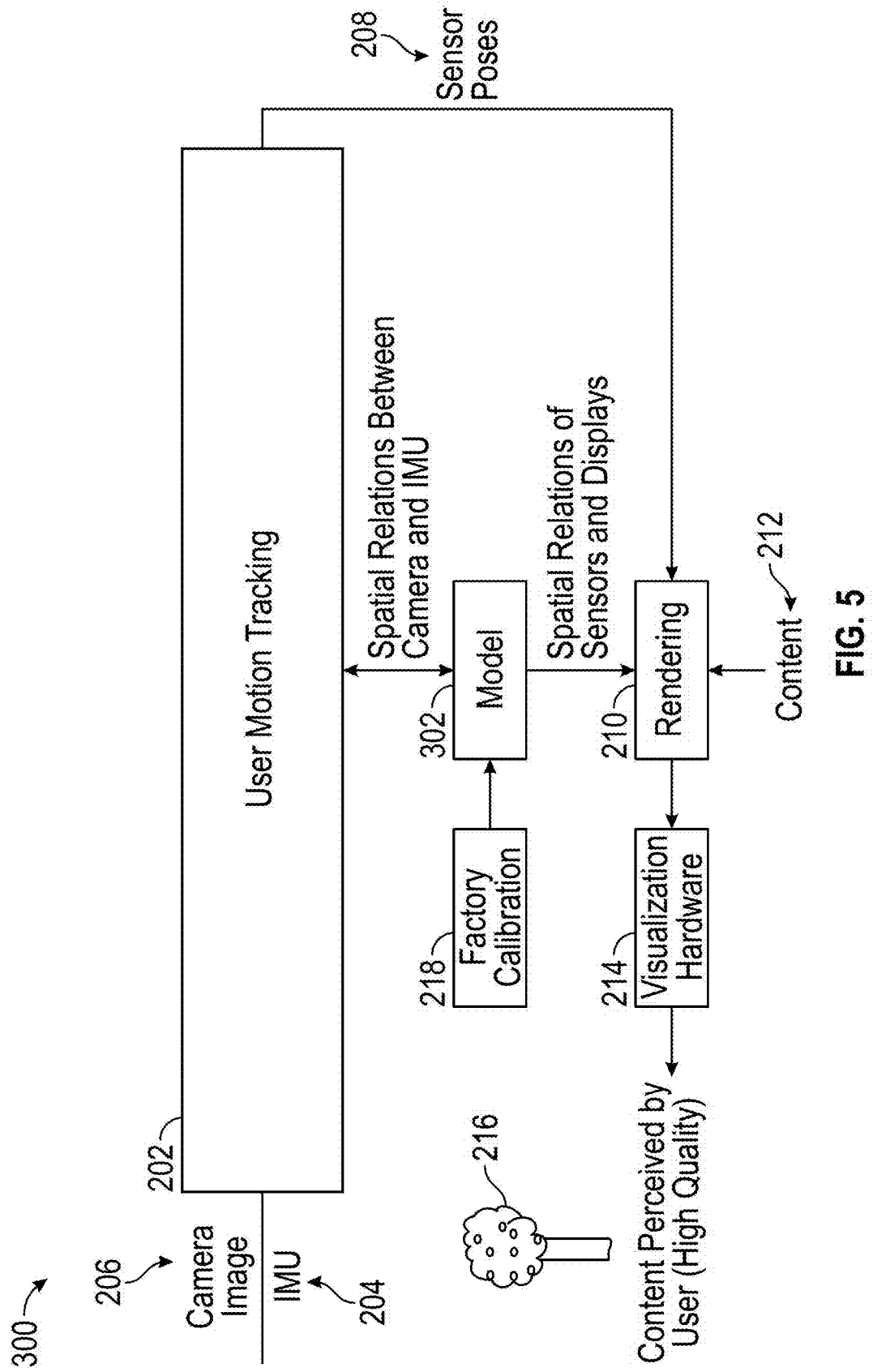
FIG. 5 illustrates an AR system according to an example of the present disclosure.

FIG. 5 illustrates an AR system according to an example of the present disclosure. Referring to FIG. 5 and comparing with FIG. 3, the AR system 300 of FIG. 5 of the present disclosure is similar in a number of aspects to the AR system 200 of FIG. 3. First, the AR system 300 comprises a user motion tracking module 202 as in FIG. 3. More specifically, the user motion tracking module 202 similarly takes sensor data as inputs, including camera captured images 206 and IMU data 204. However, the user motion tracking module 202 of the present disclosure illustrated in FIG. 5 may not take the factory calibration parameters as inputs as of the conventional AR system illustrated in FIG. 3. Instead, a new modeling module 302 may be provided to interface with the user motion tracking module 202 and other modules and/or devices of the AR system as an intermediate of the system.

The modeling module 302 interfaces with the user motion tracking module 202 and data are exchanged between them both. Instead of feeding the factory calibration parameters 218 directly to the rendering module in the conventional AR system as illustrated in FIG. 3, the modeling module 302 of the present disclosure takes the factory calibration parameters 218 as input. The modeling module 302 then exchanges data regarding the geometry of the eyewear device with the user motion tracking module 202. In some examples, the geometry information may include the spatial relations of the sensors. According to such examples, the spatial relation data that may be input/output between the user motion tracking module 202 and the modeling module 302 may include those that are between an IMU and a camera, an IMU and an IMU, or any number of cameras and IMU. According to examples of the present disclosure, any number of IMUs and any number of the cameras may be packaged in one unit and incorporated to the eyewear device as one unit. According to such examples of the present disclosure, as long as there may be at least one non-zero space offset between at least two sensor units, the AR system of the present disclosure may be provided to model the geometry change of the eyewear device on the fly, which will be described in further detail below.

The user motion tracking module 202 as described above, may be configured to track the poses of the sensors, i.e., the cameras and the IMUs. It may also detect with suitable detectors and methods whether the geometry calibrated in factory is currently valid or invalid. For example, in an AR system comprising the EKF module illustrated in connection with FIGS. 3 and 4, the algorithm may be configured to detect if the factory calibrated geometry of the eyewear device is still good. For example, persons skilled in the art understand that the EKF module may be configured to measure a reprojection error rate, which may comprise the errors caused by the geometry changes among the sensors and components of the eyewear device. More specifically, the EKF module may be configured to compare the reprojection error to a predetermined rate threshold representing normal geometric errors. The reprojection error is information that the EKF may be configured to estimate. It refers to the error corresponding to the image distance between a projected point and a measured point. The projection error may be used to measure how closely an estimate of a three-dimensional point may recreate the point's true projection. Accordingly, the EKF module may determine that an unusual amount of error is being observed and bending may have occurred. The user motion tracking module 202 may via EKF module notify the module 302 and coordinate spatial relation optimization. Further, the EKF module may be configured to further provide estimates of spatial relations among the sensors to the modeling module 302. Further, the EKF module may be configured to further provide estimate of spatial relations among the sensors to the modeling module 302. In one example of the present disclosure, the tracking module 202 and the modeling module 302 are separate modules physically and/or logically. In another example, the tracking module 202 and the modeling module 302 may be combined in one tracking-modeling module wherein additional methods may be adopted for the tracking and modeling, such as via an end-to-end learned approach or other approaches.

According to an example of the present disclosure, the modeling module 302 may be configured to re-estimate the true eyewear device geometry such as the spatial relations of the eyewear device and the display geometry and communicate the estimate to various components of the AR system. It is understood by persons of ordinary skill in the art that the geometry change may be user-induced, such as illustrated in FIG. 2A, or induced by other factors, such as due to wear-and-tear and/or environment factors where the eyewear device is used. The present disclosure may model any such geometry change in the eyewear device, provided that not all sensors are located in substantially the same location and all such geometry changes are within the contemplation of the present disclosure.

According to one example of the present disclosure, one form of the geometry change is the change of spatial relations of the components of the eyewear device due to bending, as illustrated in FIGS. 2A and 2B. In bending, it is observed that the bending of the frame of an eyewear device may follow certain rules. For example, when the frame 102 bends, it may form a continuous curve, such as illustrated in FIGS. 2A and 2B. It is observed that when an eyewear frame bends it may not bend in a random fashion. Or alternatively, the bending of the frame may be controlled by design. In one example of the present disclosure, the frame may be bent symmetrically from the middle to either ends of the front façade of the frame. In this example, the bending curve may be any one of smooth curvature, non-smooth curvature, or other forms. In another example, the frame may bend asymmetrically from one end of the front façade to the other end of the front façade. In yet another example, the bending curve may partially or wholly extend beyond the ends of the front façade and extend to the stabilizing part of the eyewear device, such as the frame arms. It is understood by persons skilled in the art that all such bending may be modeled, whether it is symmetrical or asymmetrical, smooth or non-smooth, evenly or unevenly, and/or in a shape of curve or other shapes, all of which are within the contemplations of the present disclosure.

Figure 6:
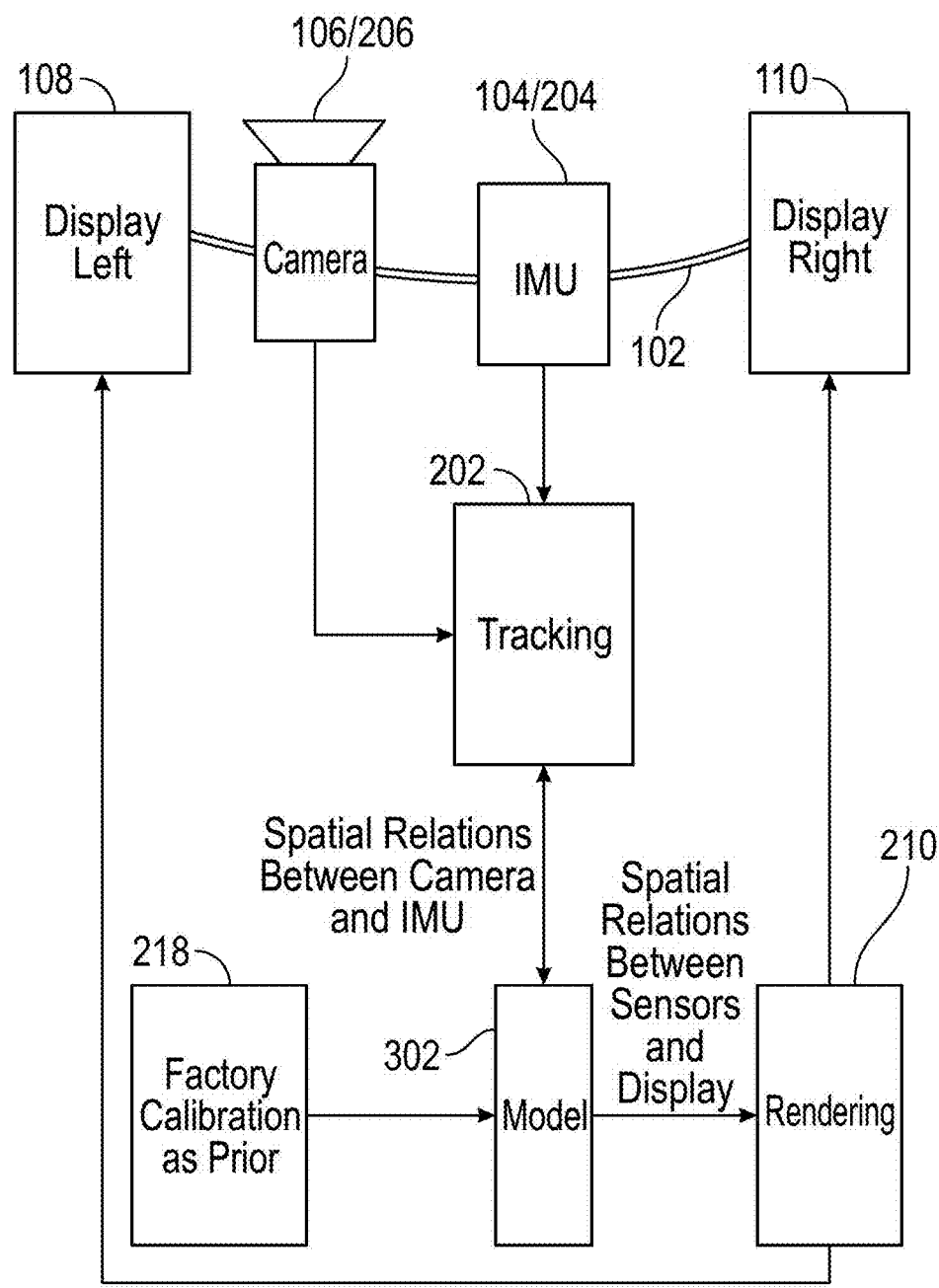
FIG. 6 illustrates the AR system from a perspective of the eyewear device according to an example of the present disclosure.

FIG. 6 illustrates the AR system from the perspective of and bending eyewear device according to an example of the present disclosure. Persons skilled in the art may appreciate that FIGS. 5 and 6 illustrate two identical systems in different perspectives, wherein FIG. 5 focuses more on general geometry change and FIG. 6 focuses more on bending, which is one form of the geometry change. The two systems are functionally equivalents. Therefore, the overlapping components of FIGS. 5 and 6 may be referred to alternatively or interchangeably hereinafter, and the descriptions of FIGS. 5 and 6 supplement each other.

Referring to FIG. 6, a bending eyewear device 100/300 is illustrated therein. Various components of the eyewear device may be located therein, such as IMU 104/204, camera 106/206 and displays 108 and 110. The various components may be distributed as described in connection with FIGS. 2A and 2B. For example, the IMU 104/204 may be located in the middle of the front façade of the frame 102, whereas the camera 106/206 may be located beside the IMU and the two displays may be located further away and closer to the ends of the front façade.

As described in connection with FIG. 5 above, the modeling module 302 may receive information from the user motion tracking module 202, which detects that the frame is now having a geometry distortion. For example, when bending has occurred, the modeling module 302 may then attempt to model the bending and feed the updated spatial information of the modeled components and provide the information to other components of the AR system, such as the user tracking system 202 and/or the rendering module 210. For example, the modeling module may select any two sensors located at a distance from each other on the frame 102 between which, their factory calibrated spatial relation may be obtained such as from the factory calibration record 218. According to the exemplary illustration, the two sensors that may be selected are IMU 104/204 and camera 106/206. The modeling module 302 may compute the spatial positions of the IMU and the camera in conjunction and/or respectively. The modeling module 302 may then compare the computed spatial difference between the two sensors measured under the bending condition to that of the spatial difference between them during the un-bent factory parameter. Persons skilled in the art may appreciate that with such comparison, the modeling system may be able to calculate all information necessary to ascertain the bending curve of frame 102.

Next, the modeling module 302 may make one or more assumptions regarding the rest of the bending frame for the purpose of modeling. For example, the modeling module may reasonably assume that the rest of the frame is bending in a curve that is smoothly and naturally extending from the curve of the frame 102. Persons skilled in the art may appreciate that the curve between the right display 110 and the IMU 104/206 and the curve between the camera 106/206 and the left display may be computed. As such the spatial relations involving any one of the left and right displays and their relative and/or absolute position may be ascertained. Further, the modeling module 302 may also model the change in the display geometry. As described elsewhere, when using a display system comprising transparent waveguides and projectors, the bending of frame may also change the geometry of the waveguides as well as the spatial relations between the waveguides and projectors, such as projection distance, of the display system. The modeling module may similarly make spatial assumptions relevant to the geometry change with regard to the display system and provide on-the-fly estimation. The new and updated eyewear geometry such as the spatial relations and/or display geometry then may be provided to the rendering unit 210. The rendering module 210 may then take into account the new geometry information, incorporating them during the process of computing the final imageries that are presented to the displays for the user's eyes.

With regard to the bending, it can be appreciated that the bending of the frame may be evenly or unevenly, smoothly or un-smoothly distributed. According to the present disclosure, the modeling module may be configured to model any bending if methods, algorithms and/or mathematical formula may model the bending accordingly. All those modeling methods and/or algorithms are within the contemplation of the present disclosure.

Referring back to FIG. 5 and comparing with FIG. 3, it can be appreciated that similar or identical processes of the content 212 may be rendered in the rendering module 210 and the visualization hardware 214, such as the displays 108 and 110 in FIG. 6, may present an augmented reality scene to the user. Furthermore, the geometry change caused by bending frame may affect the spatial relation of the displays. Such effect may be dependent on the set up of the displays. As described above, in the example of the present disclosure where the displays comprises waveguides used in conjunction with projectors, any slight changes such as those brought by the frame bending illustrated in FIGS. 5 and 6, may greatly affect the display geometry and reduce the image quality. Persons skilled in the art may appreciate that additional algorithms may be incorporated into the visualization step of 214 to mitigate and/or compensate for any specific sensitivity due to the hardware set up of some components. All such algorithms and methods are within the contemplation of the present disclosure.

Figure 7:
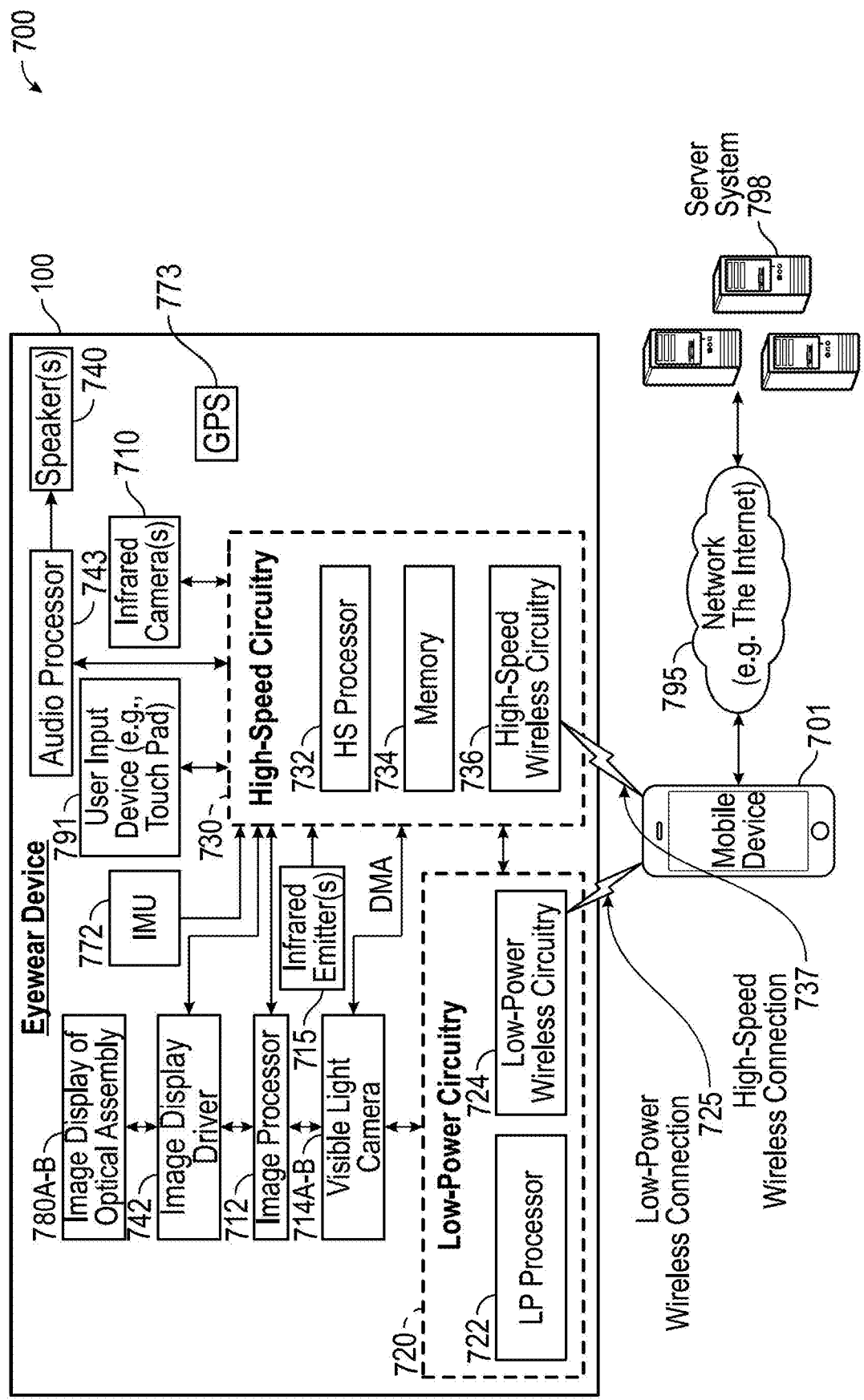
FIG. 7 illustrates a function block diagram of an example system including a wearable device and a server system connected via various networks.

FIG. 7 is a function block diagram of an example system 700 that includes a wearable device (e.g., the eyewear device 100), a mobile device 701, and a server system 798 connected via various networks 795 such as the Internet. The system 700 includes a low-power wireless connection 725 and a high-speed wireless connection 737 between the eyewear device 100 and the mobile device 701.

As shown in FIG. 7, the eyewear device 100 includes one or more visible-light cameras 714A, 714B that capture still images, video images, or both still and video images, as described herein. The cameras 714A, 714B may have a direct memory access (DMA) to high-speed circuitry 730 and function as a stereo camera. The cameras 714A, 714B may be used to capture initial-depth images that may be rendered into three-dimensional (3D) models that are texture-mapped images of a red, green, and blue (RGB) imaged scene. The device 100 may also include a depth sensor, which uses infrared signals to estimate the position of objects relative to the device 100. The depth sensor in some examples includes one or more infrared emitter(s) 715 and infrared camera(s) 710.

The eyewear device 100 further includes two image displays of each optical assembly 780A, 780B (one associated with a left side and one associated with a right side). The eyewear device 100 also includes an image display driver 742, an image processor 712, low-power circuitry 720, and high-speed circuitry 730. The image displays of each optical assembly 780A, 780B are for presenting images, including still images, video images, or still and video images. The image display driver 742 is coupled to the image displays of each optical assembly 780A, 780B in order to control the display of images.

The eyewear device 100 additionally includes one or more speakers 740 (e.g., one associated with the left side of the eyewear device and another associated with the right side of the eyewear device). The speakers 740 may be incorporated into the frame, temples, or corners of the eyewear device 100. The one or more speakers 740 are driven by audio processor 743 under control of low-power circuitry 720, high-speed circuitry 730, or both. The speakers 740 are for presenting audio signals. The audio processor 743 is coupled to the speakers 740 in order to control the presentation of sound.

The components shown in FIG. 7 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 714A, 714B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 7, high-speed circuitry 730 includes a high-speed processor 732, a memory 734, and high-speed wireless circuitry 736. In the example, the image display driver 742 is coupled to the high-speed circuitry 730 and operated by the high-speed processor 732 in order to drive the left and right image displays of each optical assembly 780A, 780B. High-speed processor 732 may be any processor capable of managing high-speed communications and operation of any general computing system needed for eyewear device 100. High-speed processor 732 includes processing resources needed for managing high-speed data transfers on high-speed wireless connection 737 to a wireless local area network (WLAN) using high-speed wireless circuitry 736.

In some examples, the high-speed processor 732 executes an operating system such as a LINUX operating system or other such operating system of the eyewear device 100 and the operating system is stored in memory 734 for execution. In addition to any other responsibilities, the high-speed processor 732 executes a software architecture for the eyewear device 100 that is used to manage data transfers with high-speed wireless circuitry 736. In some examples, high-speed wireless circuitry 736 is configured to implement Institute of Electrical and Electronic Engineers (IEEE) 802.11 communication standards, also referred to herein as Wi-Fi. In other examples, other high-speed communications standards may be implemented by high-speed wireless circuitry 736.

The low-power circuitry 720 includes a low-power processor 722 and low-power wireless circuitry 724. The low-power wireless circuitry 724 and the high-speed wireless circuitry 736 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 701, including the transceivers communicating via the low-power wireless connection 725 and the high-speed wireless connection 737, may be implemented using details of the architecture of the eyewear device 100, as can other elements of the network 795.

Memory 734 includes any storage device capable of storing various data and applications, including, among other things, camera data generated by the left and right visible-light cameras 714A, 714B, the infrared camera(s) 710, the image processor 712, and images generated for display by the image display driver 742 on the image display of each optical assembly 780A, 780B. Although the memory 734 is shown as integrated with high-speed circuitry 730, the memory 734 in other examples may be an independent, standalone element of the eyewear device 100. In certain such examples, electrical routing lines may provide a connection through a chip that includes the high-speed processor 732 from the image processor 712 or low-power processor 722 to the memory 734. In other examples, the high-speed processor 732 may manage addressing of memory 734 such that the low-power processor 722 will boot the high-speed processor 732 any time that a read or write operation involving memory 734 is needed.

As shown in FIG. 7, the high-speed processor 732 of the eyewear device 100 can be coupled to the camera system (visible-light cameras 714A, 714B), the image display driver 742, the user input device 791, and the memory 734.

The server system 798 may be one or more computing devices as part of a service or network computing system, for example, that include a processor, a memory, and network communication interface to communicate over the network 795 with an eyewear device 100 and a mobile device 701.

The output components of the eyewear device 100 include visual elements, such as the left and right image displays associated with each lens or optical assembly 780A, 780B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 780A, 780B are driven by the image display driver 742. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the position, force or position and force of touches or touch gestures, or other tactile-configured elements), and audio input components (e.g., a microphone), and the like. The mobile device 701 and the server system 798 may include alphanumeric, pointer-based, tactile, audio, and other input components.

In some examples, the eyewear device 100 includes a collection of motion-sensing components referred to as an inertial measurement unit 772. The motion-sensing components may be micro-electro-mechanical systems (MEMS) with microscopic moving parts, often small enough to be part of a microchip. The inertial measurement unit (IMU) 772 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by position sensors, such as a GPS unit 773, one or more transceivers to generate relative position coordinates, altitude sensors or barometers, and other orientation sensors. Such positioning system coordinates can also be received over the wireless connections 725, 737 from the mobile device 701 via the low-power wireless circuitry 724 or the high-speed wireless circuitry 736.

The IMU 772 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 734 and executed by the high-speed processor 732 of the eyewear device 100. According to one example of the present disclosure, one or more of the steps described herein may be performed using Strapped Down Integration (SDI), in which IMU samples may be compressed in a manner that pose changes based on initial parameters may be directly extracted without storing all the individual IMU samples.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 701 may be a smartphone, tablet, laptop computer, access point, or any other such device capable of connecting with eyewear device 100 using both a low-power wireless connection 725 and a high-speed wireless connection 737. Mobile device 701 is connected to server system 798 and network 795. The network 795 may include any combination of wired and wireless connections.

The system 700, as shown in FIG. 7, includes a computing device, such as mobile device 701, coupled to an eyewear device 100 over a network. The system 700 includes a memory for storing instructions and a processor for executing the instructions. Execution of the instructions of the system 700 by the processor 732 configures the eyewear device 100 to cooperate with the mobile device 701. The system 700 may utilize the memory 734 of the eyewear device 100 or the memory elements of the mobile device 701. Also, the system 700 may utilize the processor elements 732, 722 of the eyewear device 100 or the central processing unit (CPU) of the mobile device 701 (FIG. 5). In addition, the system 700 may further utilize the memory and processor elements of the server system 798. In this aspect, the memory and processing functions of the system 700 can be shared or distributed across the eyewear device 100, the mobile device 701, and the server system 798.

Figure 8:
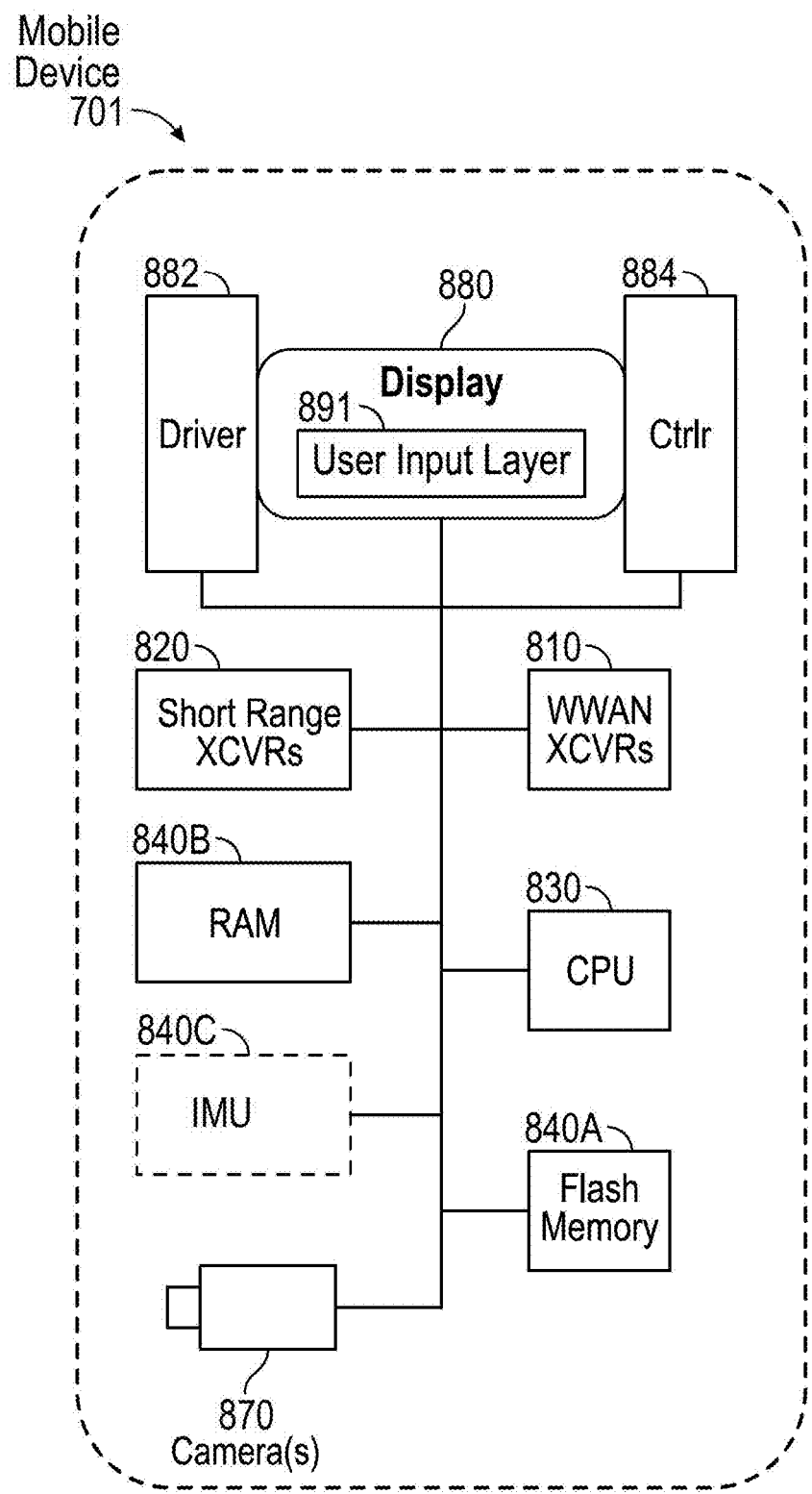
FIG. 8 illustrates function block diagram of an example hardware configuration for a mobile device of the system of FIG. 7.

FIG. 8 is function block diagram of an example hardware configuration for a mobile device of the system of FIG. 7. Mobile device 701 includes a flash memory 840A which stores programming to be executed by the CPU 830 to perform all or a subset of the functions described herein.

The mobile device 701 may include a camera 870 that comprises at least two visible-light cameras (first and second visible-light cameras with overlapping fields of view) or at least one visible-light camera and a depth sensor with substantially overlapping fields of view. Flash memory 840A may further include multiple images or video, which are generated via the camera 870.

As shown, the mobile device 701 includes an image display 880, a mobile display driver 882 to control the image display 880, and a display controller 884. In the example of FIG. 8, the image display 880 includes a user input layer 891 (e.g., a touchscreen) that is layered on top of or otherwise integrated into the screen used by the image display 880.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 8 therefore provides a block diagram illustration of the example mobile device 701 with a user interface that includes a touchscreen input layer 891 for receiving input (by touch, multi-touch, or gesture, and the like, by hand, stylus or other tool) and an image display 880 for displaying content.

As shown in FIG. 8, the mobile device 701 includes at least one digital transceiver (XCVR) 810, shown as WWAN XCVRs, for digital wireless communications via a wide-area wireless mobile communication network. The mobile device 701 also includes additional digital or analog transceivers, such as short-range transceivers (XCVRs) 820 for short-range network communication, such as via NFC, VLC, DECT, ZigBee, Bluetooth™, or Wi-Fi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate position coordinates for positioning of the mobile device 701, the mobile device 701 can include a global positioning system (GPS) receiver. Alternatively, or additionally the mobile device 701 can utilize either or both the short range XCVRs 820 and WWAN XCVRs 810 for generating position coordinates for positioning. For example, cellular network, Wi-Fi, or Bluetooth™ based positioning systems can generate very accurate position coordinates, particularly when used in combination. Such position coordinates can be transmitted to the eyewear device over one or more network connections via XCVRs 810, 820.

The transceivers 810, 820 (i.e., the network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, including 3G, 4G LTE and 5G. For example, the transceivers 810, 820 provide two-way wireless communication of information including digitized audio signals, still image and video signals, web page information for display as well as web-related inputs, and various types of mobile message communications to/from the mobile device 701.

The mobile device 701 further includes a microprocessor that functions as a central processing unit (CPU); shown as CPU 830 in FIG. 8. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 830, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 830 or processor hardware in smartphone, laptop computer, and tablet.

The CPU 830 serves as a programmable host controller for the mobile device 701 by configuring the mobile device 701 to perform various operations, for example, in accordance with instructions or programming executable by CPU 830. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 701 includes a memory or storage system, for storing programming and data. In the example, the memory system may include a flash memory 840A, a random-access memory (RAM) 840B, and IMU 840C, as needed. The RAM 840B serves as short-term storage for instructions and data being handled by the CPU 830, e.g., as a working data processing memory. The flash memory 840A typically provides longer-term storage.

Hence, in the example of mobile device 701, the flash memory 840A is used to store programming or instructions for execution by the CPU 830. Depending on the type of device, the mobile device 701 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Figure 9:
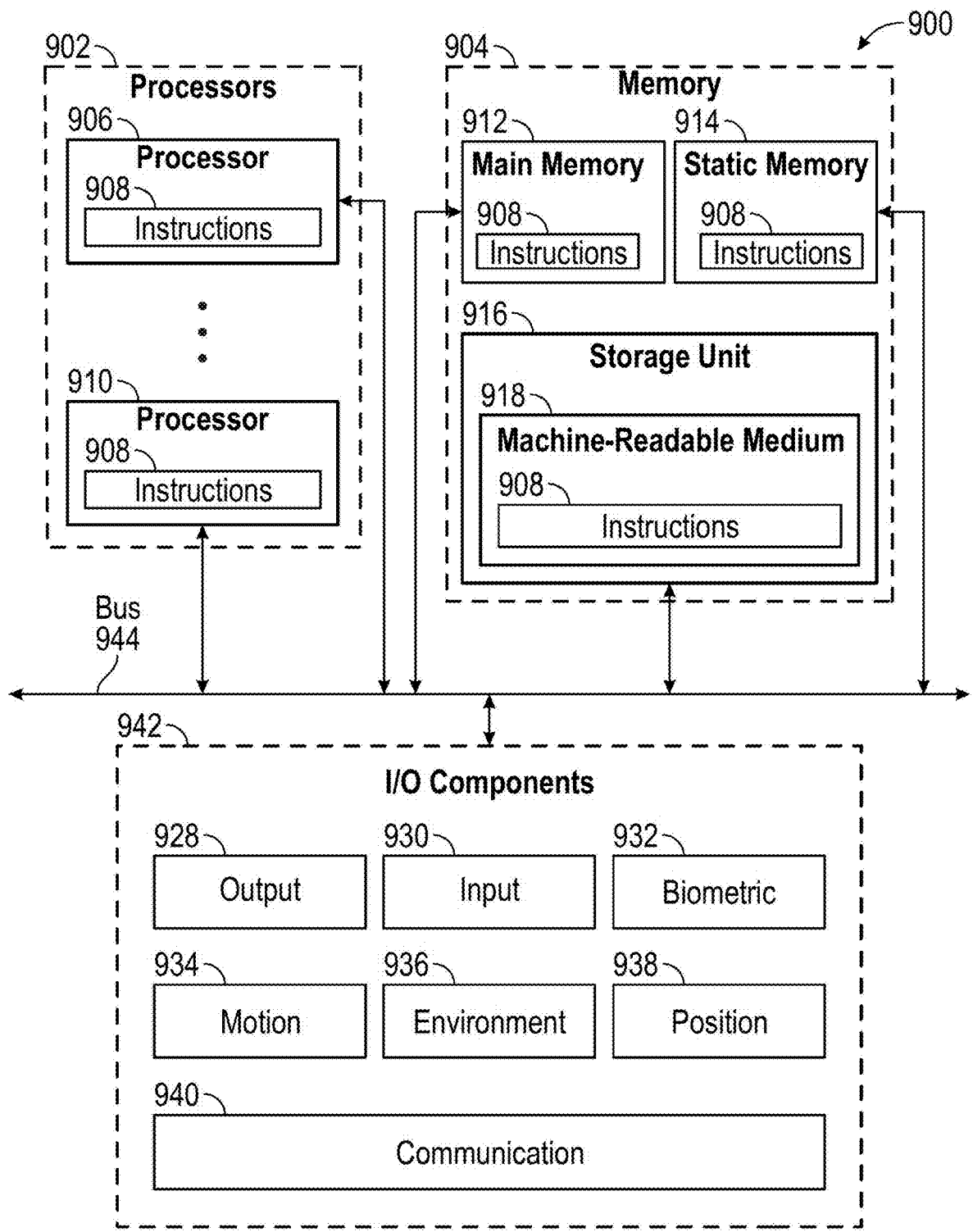
FIG. 9 illustrates a diagrammatic representation of an example machine in the form of a computer system within which the present disclosure may be implemented.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical position to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides position, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include position sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to networks and client devices. For example, the communication components 940 may include a network interface component or another suitable device to interface with a network. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as position via Internet Protocol (IP) geoposition, position via Wi-Fi® signal triangulation, position via detecting an NFC beacon signal that may indicate a particular position, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over a network, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via a coupling (e.g., a peer-to-peer coupling) to devices.

Figure 10:
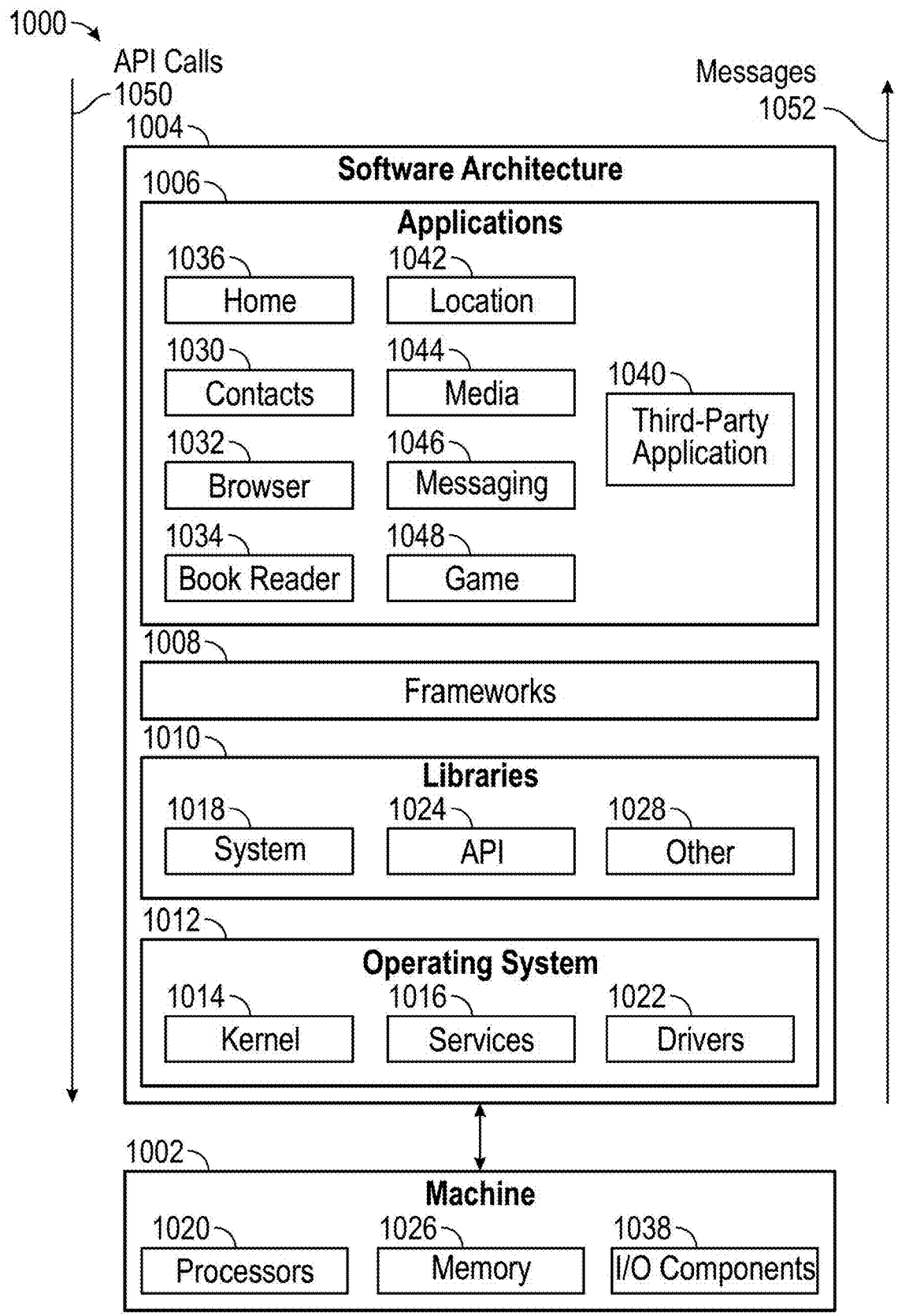
FIG. 10 illustrates a diagrammatic representation of an example software architecture within which the present disclosure may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level position services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a position application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

The disclosure describes the bending mitigation process in connection with a user motion tracking module is EKF-driven. Persons skilled in the art understand that there are other methods/algorithms that can provide the same motion tracking functions, such as using machine learning. Therefore, the implementation details on the user motion tracking module 202 is exemplary but not limiting.

The present disclosure encompasses all changes, substitutions, variations, alterations, and modifications to the examples herein that a person having ordinary skill in the art would comprehend. Similarly, where appropriate, the appended claims encompass all changes, substitutions, variations, alterations, and modifications to the examples herein that a person having ordinary skill in the art would comprehend.

What is claimed is:

1. An eyewear device for displaying augmented reality images, comprising:
   a first sensor;
   a second sensor;
   at least one image sensor;
   at least one display for displaying the augmented reality images, wherein the eyewear device has a predetermined geometry defining spatial relations of at least two of the first sensor, the second sensor, or the at least one display; and
   an augmented reality image rendering system that receives inputs from the at least one image sensor and readings from at least one of the first sensor or the second sensor to compute poses of the at least one image sensor and the at least one of the first and second sensors from the inputs and predetermined geometry during use of the eyewear device in an augmented reality application, the augmented reality system further configured to estimate an updated geometry of the eyewear device from the poses as a result of a geometry change of the eyewear device and to render the augmented reality images including virtual content and real-world objects on the at least one display in accordance with the estimated updated geometry.

2. The eyewear device of claim 1, wherein the augmented reality image rendering system comprises a motion tracking module that implements a computer vision processing algorithm that computes poses of the at least one image sensor and at least one of the first or second sensor the from the estimated updated geometry.

3. The eyewear device of claim 2, wherein the motion tracking module further provides the poses of the at least one image sensor and the at least one of the first or second sensor to a rendering module to render the augmented reality images.

4. The eyewear device of claim 3, wherein the rendering module receives real-world and virtual content to be rendered as input and combines the real-world and virtual content for concurrent display on the at least one display.

5. The eyewear device of claim 4, wherein the rendering module uses the poses to organize and arrange real-world and virtual objects in a same frame of a video sequence for display on the at least one display.

6. The eyewear device of claim 4, wherein the rendering module receives factory calibration data and displays the real-world and virtual objects according to the calibration data.

7. The eyewear device of claim 3, wherein the rendering module implements an algorithm that adjusts rendering of the augmented reality images on the at least one display using a bending curve model of a real-time geometry of the eyewear device based on the estimated updated geometry of the eyewear device.

8. The eyewear device of claim 7, wherein a bending curve of the bending curve model is at least one of asymmetrical, non-smooth, or uneven.

9. The eyewear device of claim 2, wherein the motion tracking module comprises at least one of an Extended Kalman Filter (EKF)-driven motion tracking module, an optimization-based module that coordinates spatial relation optimization, or a machine learning-driven module that provides motion tracking.

10. The eyewear device of claim 2, wherein the motion tracking module implements an end-to-end learned approach for tracking and modeling real-time geometry of the eyewear device.

11. A method for displaying augmented reality images on an eyewear device including a first sensor, a second sensor, at least one image sensor, and at least one display for displaying the augmented reality images, the eyewear device having a predetermined geometry defining spatial relations of at least two of the first sensor, the second sensor, or the at least one display, comprising:
   receiving inputs from the at least one image sensor and readings from at least one of the first sensor or the second sensor;
   computing poses of the at least one image sensor and the at least one of the first and second sensors from the inputs and predetermined geometry of the at least one image sensor and at least one of the first sensor or the second sensor during use of the eyewear device in an augmented reality application;
   estimating an updated geometry of the eyewear device from the poses as a result of a geometry change of the eyewear device; and
   rendering the augmented reality images including virtual content and real-world objects on the at least one display in accordance with the estimated updated geometry.

12. The method of claim 11, further comprising receiving real-world and virtual content to be rendered and combining the real-world and virtual content for concurrent display on the at least one display.

13. The method of claim 12, further comprising organizing and arranging real-world and virtual objects in a same frame of a video sequence for display on the at least one display using the poses.

14. The method of claim 12, further comprising receiving factory calibration data and displaying the real-world and virtual objects according to the calibration data.

15. The method of claim 11, further comprising adjusting rendering of the augmented reality images on the at least one display using a bending curve model of a real-time geometry of the eyewear device based on the estimated updated geometry of the eyewear device.

16. The method of claim 15, wherein a bending curve of the bending curve model is at least one of asymmetrical, non-smooth, or uneven.

17. The method of claim 11, wherein estimating an updated geometry of the eyewear device from the poses as a result of a geometry change of the eyewear device comprises at least one of:
   providing motion tracking of at least one of the first sensor or the second sensor, the at least one image sensor, and the at least one display using at least one of an Extended Kalman Filter (EKF)-driven motion tracking module, an optimization-based module that coordinates spatial relation optimization, or a machine learning-driven module that provides motion tracking; or
   implementing an end-to-end learned approach for tracking and modeling a real-time geometry of the eyewear device.

18. The method of claim 11, wherein estimating an updated geometry of the eyewear device from the poses as a result of a geometry change of the eyewear device comprises receiving and processing at least one of inertial data from at least one of the first sensor or the second sensor or image data from the at least one image sensor to track motion of the at least one of the first sensor or the second sensor, the at least one image sensor, and the at least one display with respect to each other.

19. A non-transitory computer-readable medium comprising instructions stored therein that, when executed by one or more processors, cause the one or more processors to display augmented reality images on an eyewear device including a first sensor, a second sensor, at least one image sensor, and at least one display for displaying the augmented reality images, the eyewear device having a predetermined geometry defining spatial relations of at least two of the first sensor, the second sensor, or the at least one display, by performing operations comprising:
   receiving inputs from the at least one image sensor and readings from at least one of the first sensor or the second sensor;
   computing poses of the at least one image sensor and the at least one of the first and second sensors from the inputs and predetermined geometry of the at least one image sensor and at least one of the first sensor or the second sensor during use of the eyewear device in an augmented reality application;
   estimating an updated geometry of the eyewear device from the poses as a result of a geometry change of the eyewear device; and
   rendering the augmented reality images including virtual content and real-world objects on the at least one display in accordance with the estimated updated geometry.

20. The medium of claim 19, further comprising instructions that, when executed by the one or more processors, further cause the one or more processors to estimate an updated geometry of the eyewear device from the poses as a result of a geometry change of the eyewear device by performing operations comprising at least one of:
   providing motion tracking of at least one of the first sensor or the second sensor, the at least one image sensor, and the at least one display using at least one of an Extended Kalman Filter (EKF)-driven motion tracking module, an optimization-based module that coordinates spatial relation optimization, or a machine learning-driven module that provides motion tracking;
   implementing an end-to-end learned approach for tracking and modeling a real-time geometry of the eyewear device; or
   receiving and processing at least one of inertial data from at least one of the first sensor or the second sensor or image data from the at least one image sensor to track motion of the at least one of the first sensor or the second sensor, the at least one image sensor, and the at least one display with respect to each other.

* * * * *